(12) United States Patent
Takagi

(10) Patent No.: US 10,447,934 B2
(45) Date of Patent: Oct. 15, 2019

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventor: Yosuke Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/890,819

(22) Filed: Feb. 7, 2018

(65) Prior Publication Data

US 2018/0234631 A1 Aug. 16, 2018

(30) Foreign Application Priority Data

Feb. 14, 2017 (JP) .................................. 2017-025383

(51) Int. Cl.
  *H04N 5/232* (2006.01)

(52) U.S. Cl.
  CPC ..... *H04N 5/23293* (2013.01); *H04N 5/23216* (2013.01); *H04N 5/23222* (2013.01); *H04N 5/23245* (2013.01); *H04N 5/23296* (2013.01); *H04N 5/232127* (2018.08); *H04N 5/232935* (2018.08); *H04N 5/232945* (2018.08)

(58) Field of Classification Search
  CPC ........... H04N 5/23293; H04N 5/23296; H04N 5/23222; H04N 5/23245; G02B 7/102
  See application file for complete search history.

(56) References Cited

U.S. PATENT DOCUMENTS

| 10,015,404 B2* | 7/2018 | Hara | H04N 5/23293 |
| 2008/0044169 A1* | 2/2008 | Wernersson | H04N 5/232 396/50 |
| 2008/0192020 A1* | 8/2008 | Kang | G06F 3/017 345/173 |
| 2010/0066810 A1* | 3/2010 | Ryu | H04N 5/232 348/36 |
| 2011/0234640 A1* | 9/2011 | Ishida | G06K 9/00221 345/671 |

(Continued)

FOREIGN PATENT DOCUMENTS

| JP | 2012-060567 A | 3/2012 |
| JP | 2016-163104 A | 9/2016 |

*Primary Examiner* — Abdelaaziz Tissire
(74) *Attorney, Agent, or Firm* — Canon USA, Inc. IP Division

(57) ABSTRACT

An imaging apparatus capable of adjusting an orientation guide with good accuracy includes an orientation detection unit configured to detect an orientation of the imaging apparatus, a control unit configured to perform control to display an orientation guide for indicating an orientation of the imaging apparatus based on the orientation detected by the orientation detection unit, a display control unit configured to perform control to perform 2-area enlargement display for displaying live view images captured in two different areas horizontally or vertically separated from each other by an imaging unit, side by side on a display unit, and an adjustment unit configured to, upon reception of a specific operation while the 2-area enlargement display is being performed, adjust a reference of the orientation guide based on the orientation detected by the orientation detection unit when the specific operation is received.

21 Claims, 6 Drawing Sheets

(56) References Cited

U.S. PATENT DOCUMENTS

| | | | |
|---|---|---|---|
| 2012/0229675 A1* | 9/2012 | Yamamoto | H04N 5/23212 348/231.99 |
| 2013/0141524 A1* | 6/2013 | Karunamuni | H04N 5/23293 348/38 |
| 2014/0160233 A1* | 6/2014 | Ishida | H04N 5/2258 348/36 |
| 2015/0002698 A1* | 1/2015 | Yu | H04N 5/23293 348/231.99 |
| 2017/0054913 A1* | 2/2017 | Hara | H04N 5/23293 |
| 2018/0183993 A1* | 6/2018 | Kobayashi | H04N 5/23216 |
| 2018/0183996 A1* | 6/2018 | Takahashi | H04N 5/23245 |
| 2018/0184006 A1* | 6/2018 | Takagi | H04N 5/23296 |
| 2018/0184007 A1* | 6/2018 | Matsushima | H04N 5/23296 |
| 2018/0184008 A1* | 6/2018 | Kondo | H04N 5/232935 |
| 2018/0234630 A1* | 8/2018 | Kondo | H04N 5/23216 |

\* cited by examiner

IMAGING APPARATUS, METHOD FOR CONTROLLING THE SAME, AND STORAGE MEDIUM

BACKGROUND

Field of the Disclosure

The present disclosure generally relates to imaging and, more particularly, to an imaging apparatus, a method for controlling the imaging apparatus, a storage medium, and a technique for enlarging display of a part of a live view image.

Description of the Related Art

When using a camera, it is desirable to image a subject while horizontally holding the camera in some cases. For example, if the camera is not horizontally held when imaging a subject such as a building or scenery, a captured image is inclined and an awkward result may be obtained. To solve the issue, Japanese Patent Application Laid-Open No. 2012-060567 discusses a technique for detecting the orientation of a camera based on the direction of gravity detected by an acceleration sensor, and displaying the level display indicating the detected camera orientation together with a live view. Japanese Patent Application Laid-Open No. 2016-163104 discusses a technique for displaying, side by side, enlarged images of two different areas horizontally separated from each other on the live view image, making it possible to visually perform horizontal adjustment with good accuracy.

When imaging a subject with which a horizontal line can be confirmed, using the display discussed in Japanese Patent Application Laid-Open No. 2016-163104 makes it possible to horizontally adjust the orientation of the camera with good accuracy. However, in an imaging scene where there is no subject with which a horizontal line can be confirmed, it is difficult to effectively use the display.

On the other hand, basically, using an orientation guide (level display) discussed in Japanese Patent Application Laid-Open No. 2012-060567 allows a user to desirably adjust the camera orientation with good accuracy even in an imaging scene where there is no subject with which a horizontal line can be confirmed. However, the accuracy of the orientation guide may be degraded by various factors including environmental changes such as change in temperature, impact from the outside, and deformation or distortion of an apparatus due to aging (for example, deformation at a location where an orientation sensor such as an acceleration sensor is attached). In such a case, the accuracy of the orientation guide can be improved by adjusting (calibrating) the orientation guide. However, to perform accurate adjustment of a camera, it is necessary to precisely set the camera in a reference orientation (for example, horizontal orientation).

SUMMARY

The present disclosure generally relates to an imaging apparatus capable of adjusting an orientation guide with good accuracy, a method for controlling the imaging apparatus, and recording medium.

According to one or more aspects of the present disclosure, an imaging apparatus includes an orientation detection unit configured to detect an orientation of the imaging apparatus, a control unit configured to perform control to display an orientation guide for indicating an orientation of the imaging apparatus based on the orientation detected by the orientation detection unit, a display control unit configured to perform control to perform 2-area enlargement display for displaying live view images captured in two different areas horizontally or vertically separated from each other by an imaging unit, side by side on a display unit, and an adjustment unit configured to, upon reception of a specific operation while the 2-area enlargement display is being performed, adjust a reference of the orientation guide based on the orientation detected by the orientation detection unit when the specific operation is received.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the accompanying drawings. It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

Figure 1A:
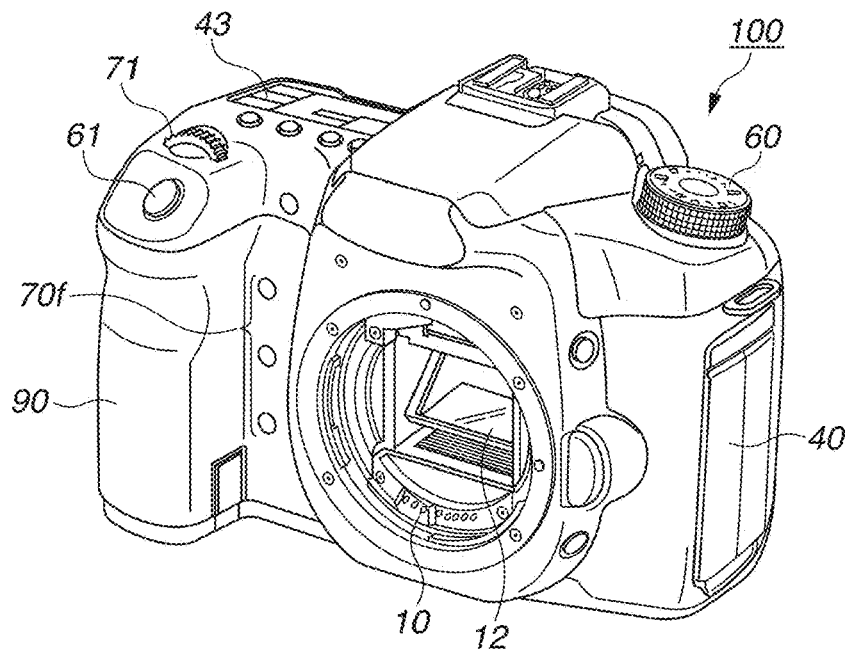
FIGS. 1A and 1B illustrate an appearance of a digital camera.
Figure 1B:
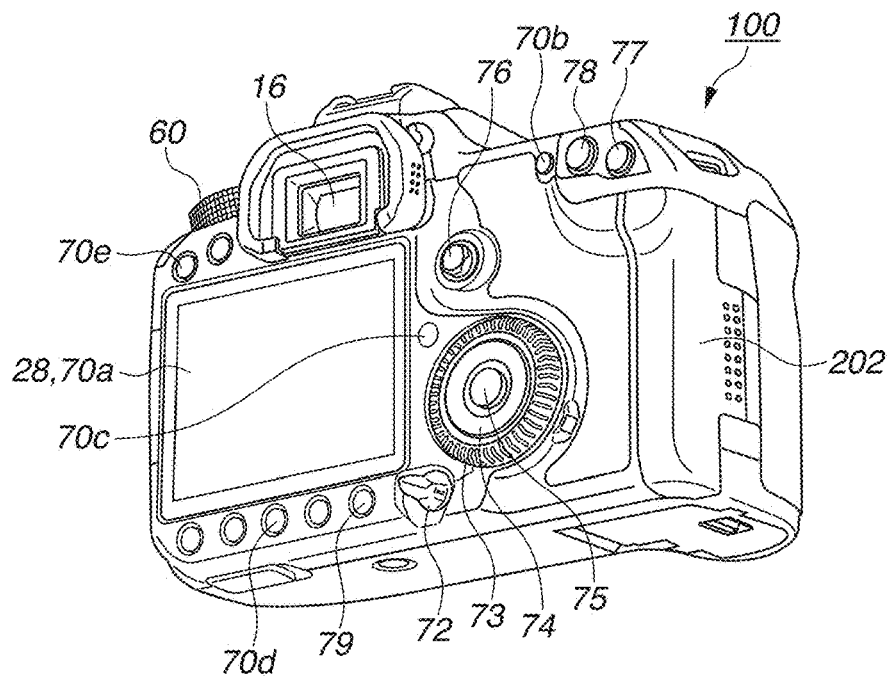

FIGS. 1A and 1B illustrate an outer appearance of a digital camera 100 as an example of an apparatus according to the present disclosure. FIG. 1A is a perspective view illustrating the front panel of the digital camera 100, and FIG. 1B is a perspective view illustrating the rear panel of the digital camera 100. Referring to FIGS. 1A and 1B, a display unit 28 disposed on the rear panel displays an image and various information. An out-finder display unit 43, a display unit disposed on the top face, displays the shutter speed, diaphragm, and other various setting values of the camera 100. A shutter button 61 is an operation portion for issuing an imaging instruction. A mode selection switch 60 is an operation portion for switching between various modes. A terminal cover 40 is a cover for protecting connectors (not illustrated) such as a connection cable for connecting an external apparatus and the digital camera 100. A main electronic dial 71 is a rotary operation member included in an operation unit 70. Turning the main electronic dial 71 enables changing setting values such as the shutter speed and diaphragm. A power switch 72 is an operation member for turning power of the digital camera 100 ON and OFF. A sub electronic dial 73, a rotary operation member included in the operation unit 70, enables moving a selection frame and feeding images. A cross key 74 included in the operation unit 70 is a cross key (four-way key) of which the upper, lower, right, and left portions can be pressed in. An operation corresponding to a pressed portion on the cross key 74 can be performed. A SET button 75 included in the operation unit 70 is mainly used to determine a selection item. A live view (LV) button 76 included in the operation unit 70 turns the live view (LV) ON and OFF in the still image imaging mode. In the moving image capturing mode, the LV button 76 is used to instruct the camera 100 to start and stop moving image capturing (recording). An enlargement button 77, an operation button included in the operation unit 70, turns the enlargement mode ON and OFF in live view display in the imaging mode and changes the magnification in the enlargement mode. In the playback image, the enlargement button 77 enlarges the playback image and increases the magnification. A reduction button 78 included in the operation unit 70 reduces the magnification of the enlarged playback image to reduce the displayed image. A playback button 79 included in the operation unit 70 switches between the imaging mode and the playback mode. When a user presses the playback button 79 in the imaging mode, the camera 100 enters the playback mode, and the latest image of images recorded in a recording medium 200 is displayed on the display unit 28. A quick return mirror 12 is moved up and down by an actuator (not illustrated) under the direction of a system control unit 50. A communication terminal 10 is used by the digital camera 100 to communicate with the detachably attached lens. An eyepiece finder 16 is a look-in type finder for confirming the focus and composition of an optical image of a subject obtained through a lens unit 150 by observing a focusing screen 13. A cover 202 is a cover of a slot storing the recording medium 200. A grip portion 90 is a holding portion having a shape which is easy to grasp with the right hand, when the user holds the digital camera 100.

Figure 2:
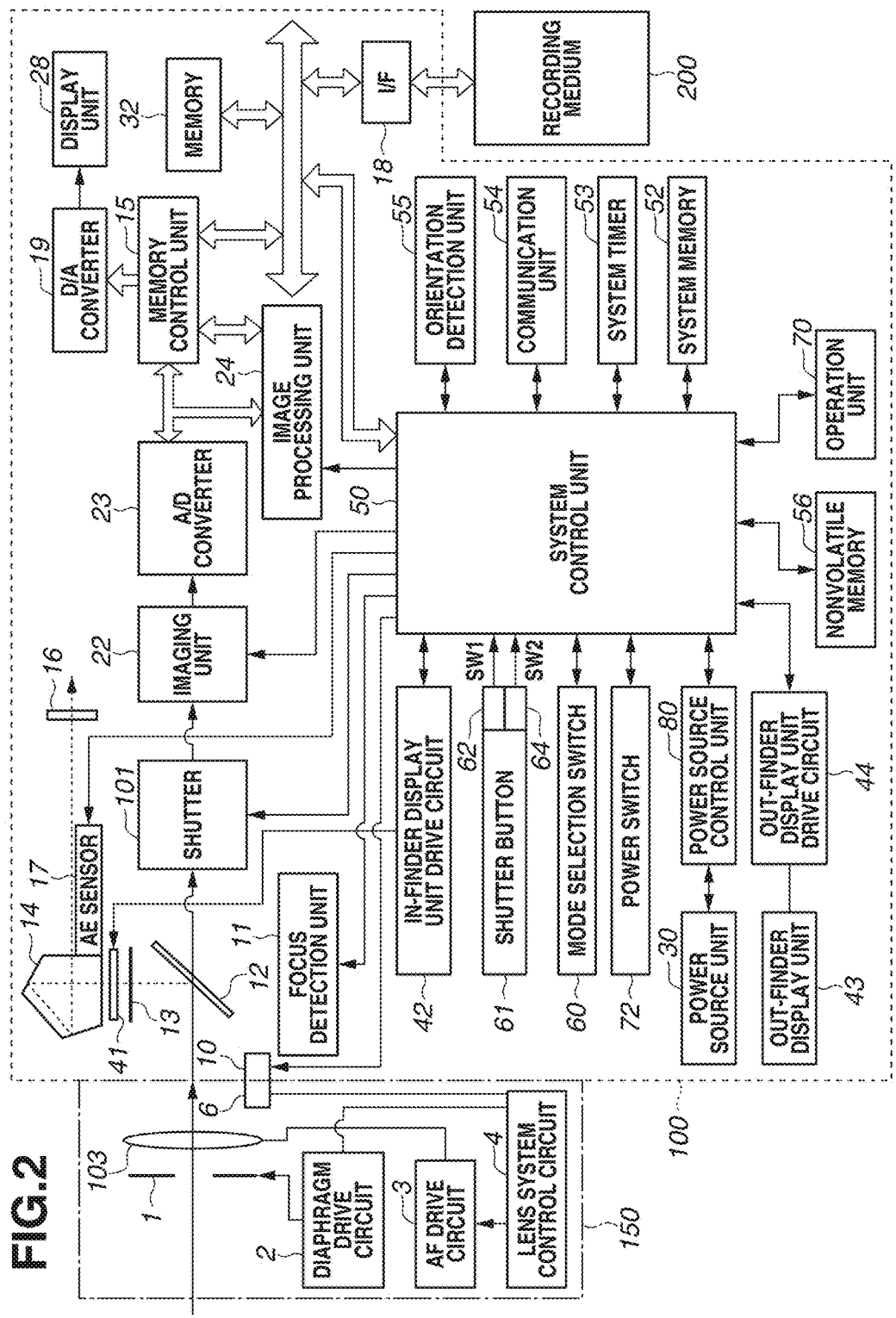
FIG. 2 is a block diagram illustrating a configuration of the digital camera.

FIG. 2 is a block diagram illustrating an example of a configuration of the digital camera 100 according to the present exemplary embodiment.

Referring to FIG. 2, the lens unit 150 mounts an exchangeable imaging lens.

Although the lens 103 includes a plurality of lenses, FIG. 2 illustrates only one lens for simplification. A communication terminal 6 is used by the lens unit 150 to communicate with the digital camera 100. The communication terminal 10 is used by the digital camera 100 to communicate with the lens unit 150. The lens unit 150 communicates with the system control unit 50 via the communication terminals 6 and 10. In the lens unit 150, a lens system control circuit 4 controls a diaphragm 1 via a diaphragm drive circuit 2 and changes the position of the lens 103 via an AF drive circuit 3 to focus on the subject.

An auto exposure (AE) sensor 17 measures the luminance of the subject through the lens unit 150.

A focus detection unit 11 outputs defocus amount information to the system control unit 50. The system control unit 50 controls the lens unit 150 based on the information to perform phase difference autofocus (AF).

When performing exposure, live view imaging, and moving image capturing, the quick return mirror 12 (hereinafter referred to as a mirror 12) is moved up and down by the actuator (not illustrated) under the direction of the system control unit 50. The mirror 12 switches the destination of the incident light flux from the lens 103 between the finder 16 and an imaging unit 22. In the normal state, the mirror 12 is usually disposed to reflect the light flux to guide it to the finder 16. In the imaging and live view display states, the mirror 12 pops up to guide the light flux to the imaging unit 22 and retreats from the light flux (mirror up). The center portion of the mirror 12 is configured as a half mirror to transmit a part of light so that a part of the light flux is incident to the focus detection unit 11 for performing focus detection.

A photographer can confirm the focus and composition of an optical image of a subject obtained through the lens unit 150 by observing the focusing screen 13 via a pentaprism 14 and the finder 16.

A shutter 101 is a focal plane shutter capable of freely controlling the exposure time of the imaging unit 22 under the control of the system control unit 50.

The imaging unit 22 is an image sensor including a charge coupled device (CCD) sensor or a complementary metal oxide semiconductor (CMOS) sensor for converting an optical image into an electric signal. An analog-to-digital (A/D) converter 23 converts an analog signal into a digital signal. The A/D converter 23 is used to convert the analog signal output from the imaging unit 22 into a digital signal.

An image processing unit 24 performs predetermined pixel interpolation, resizing processing such as reduction, and color conversion processing on data from the A/D converter 23 or data from a memory control unit 15. The image processing unit 24 performs predetermined calculation processing by using captured image data. The system control unit 50 performs exposure control and ranging control based on an obtained calculation result. This enables performing the AF processing, AE processing, and pre-flash (EF) processing based on the Through the Lens (TTL) method. The image processing unit 24 further performs predetermined calculation processing by using captured image data, and performs TTL-based automatic white balance (AWB) processing based on the obtained calculation result.

The output data from the A/D converter 23 is written in the memory 32 via the image processing unit 24 and the memory control unit 15, or directly written in the memory 32 via the memory control unit 15. The memory 32 stores image data captured by the imaging unit 22 and converted into digital data by the A/D converter 23, and stores image data to be displayed on the display unit 28. The memory 32 is provided with a sufficient storage capacity for storing a predetermined number of still images and moving images and sound for a predetermined time.

The memory 32 also serves as an image display memory (video memory). A digital-to-analog (D/A) converter 19 converts image display data stored in the memory 32 into an analog signal and supplies the analog signal to the display unit 28. In this way, the image display data written in the memory 32 is displayed on the display unit 28 via the D/A converter 19. The display unit 28 displays an image corresponding to the analog signal from the D/A converter 19 on a display such as a liquid crystal display (LCD). The digital signal generated through A/D conversion by the A/D converter 23 and stored in the memory 32 is converted into an analog signal by the D/A converter 19 and successively transmitted to the display unit 28. The display unit 28 displays an image based on the analog signal, functioning as an electronic view finder capable of live view display.

A frame (AF frame) indicating the focusing point at which autofocus is currently being performed and icons indicating the setting conditions of the camera 100 are displayed on an in-finder LCD unit 41 via an in-finder display unit drive circuit 42.

The shutter speed, diaphragm, and other various setting values of the camera 100 are displayed on the out-finder display unit 43 via an out-finder display unit drive circuit 44.

A nonvolatile memory 56 is an electrically erasable recordable memory such as an electrically erasable programmable read only memory (EEPROM). Constants and programs for operations of the system control unit 50 are stored in the nonvolatile memory 56. Programs stored in the nonvolatile memory 56 refer to programs for executing various flowcharts (described below) according to the present exemplary embodiments.

The system control unit 50 may have one or more processors and one or more memories, and may control the entire digital camera 100. Each piece of processing according to the present exemplary embodiment (described below) is implemented when the system control unit 50 executes the above-described programs recorded in the nonvolatile memory 56. A system memory 52 is a random access memory (RAM). The constants and variables for operations of the system control unit 50 and the programs read from the nonvolatile memory 56 are loaded into the system memory 52. The system control unit 50 also controls the memory 32, the D/A converter 19, and the display unit 28 to perform display control.

A system timer 53 is a time measurement unit for measuring time used for various control and time of a built-in clock.

The mode selection switch 60, a first shutter switch 62, a second shutter switch 64, and the operation unit 70 are operation portions for inputting various operation instructions to the system control unit 50.

The mode selection switch 60 switches the operation mode of the system control unit 50 between the still image recording mode, the moving image capturing mode, and the playback mode. Modes included in the still image recording mode include the auto imaging mode, auto scene determination mode, manual mode, diaphragm priority mode (Av mode), and shutter speed priority mode (Tv mode). The digital camera 100 is provided with various scene modes as imaging settings for each imaging scene, the programmed AE mode, and the custom mode. The mode selection switch 60 allows the user to directly select one of these modes. Alternatively, after selecting the imaging mode list screen by using the mode selection switch 60, the user may select either one of a plurality of displayed modes by using other operation member. Likewise, a plurality of modes may also be included in the moving image capturing mode.

The first shutter switch 62 turns ON in the middle of an operation (half-depression) of the imaging operation member provided on the digital camera 100, i.e., the shutter button 61, to generate a first shutter switch signal SW1. The half-depression refers to a first operation, i.e., an imaging preparation instruction. The first shutter switch signal SW1 causes the system control unit 50 to start operations for imaging preparation processing including the AF processing, AE processing, AWB processing, and EF processing.

A second shutter switch 64 turns ON upon completion of an operation (full-depression) of the shutter button 61 to generate a second shutter switch signal SW2. The full-depression refers to a second operation, i.e., an imaging instruction operation. The second shutter switch signal SW2 causes the system control unit 50 to start a series of operations in the imaging processing from signal reading from the imaging unit 22 to image data writing in the recording medium 200.

When the user performs an operation for selecting any one of various function icons displayed on the display unit 28, each operation member of the operation unit 70 is suitably assigned a function for each scene and serves as a function button. Examples of function buttons include the end button, return button, image advancing button, jump button, narrowing-down button, and attribute change button. For example, when a menu button 70e is pressed, the menu screen allowing various settings is displayed on the display unit 28. The user can intuitively perform various settings by using the menu screen displayed on the display unit 28, the cross key 74 (four-way operation key), and the SET button 75.

The operation unit 70 includes various operation members as an input unit for receiving operations from the user. The operation unit 70 includes at least the following operation members: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a four-way button of which the upper, lower, right, and left portions can be pressed in. Although, in the present exemplary embodiment, the cross key 74 is described as an integrally formed operation portion, the cross key 74 may be provided as four independent buttons (upper, lower, right, and left buttons). Hereinafter, the top and button keys are collectively referred to as a top/bottom key, and the right and left keys are collectively referred to as a right/left key. The operation unit 70 also includes the following operation portions.

An AF-ON button 70b is a push-in button switch included in the operation unit 70. Pressing this button issues an instruction for executing AF. The depressing direction of the AF-ON button 70b is parallel to the direction (optical axis) of subject light incident to the imaging unit 22 from the lens 103.

A quick setting key 70c (hereinafter referred to as a Q button 70c) is a push-in button switch included in the operation unit 70. Pressing this key displays a quick setting menu as a list of setting items settable in each operation mode. For example, the Q button 70c is pressed during the imaging standby state in live view imaging, a list of setting items including the electronic leading blade shutter, monitor brightness, LV screen WB, 2-area enlargement, and silent imaging is superimposed on the LV in one row. When the user selects a desired option in the displayed quick setting menu by using the top/bottom key and then press a SET button, the user can shift to the setting change and operation mode related to the selected setting item.

An active frame change button 70d is a push-in button switch included in the operation unit 70. Pressing this button in the 2-area enlargement processing (described below) selects the active enlarged position (frame) out of the two enlarged positions. This button is assigned different functions depending on the operation modes. Pressing this button in the playback mode gives a protection attribute to the displayed image.

The menu button 70e is a push-in button switch included in the operation unit 70. Pressing this button displays on the display unit 28 the menu screen in which various settings are possible.

Function buttons 70f are three push-in button switches included in the operation unit 70. The function buttons 70f are assigned different functions. The function buttons 70f are disposed at positions which can be operated with the middle finger, third finger, and little finger of the right hand holding the grip portion 90. The depressing direction is parallel to the direction (optical axis) of the subject light incident to the imaging unit 22 from the lens 103.

A power source control unit 80 includes a battery detection circuit, a direct-current to direct-current (DC-DC) converter, and a switch circuit for selecting a block to be supplied with power. The power source control unit 80 detects the presence or absence of a battery, the battery type, and the remaining battery capacity. The power source control unit 80 also controls the DC-DC converter based on the result of the detection and an instruction of the system control unit 50 to supply various voltages to the recording medium 200 and other components for various time periods.

A power source unit 30 includes a primary battery (such as an alkaline battery and a lithium battery), a secondary battery (such as a NiCd battery, NiMH battery, and Li battery), and an alternating current (AC) adaptor. A recording medium interface (I/F) 18 is an interface to the recording medium 200 such as a memory card and hard disk. The recording medium 200 is such a recording medium as a memory card for recording captured images, including a semiconductor memory and magnetic disk.

A communication unit 54 wirelessly or wiredly establishes connection to perform transmission and reception of an image signal and an audio signal. The communication unit 54 can also connect with a wireless Local Area Network (LAN) and the Internet. The communication unit 54 can transmit images (including a live view image) captured by the imaging unit 22 and images recorded in the recording medium 200, and receive image data and other various information from an external apparatus.

An orientation detection unit 55 detects the orientation of the digital camera 100 in the gravity direction. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can add direction information corresponding to the orientation detected by the orientation detection unit 55 to the image file of the image captured by the imaging unit 22 or rotate the image before recording. An acceleration sensor or a gyroscope sensor can be used as the orientation detection unit 55.

The units described throughout the present disclosure are exemplary and/or preferable modules for implementing processes described in the present disclosure. The modules can be hardware units (such as circuitry, firmware, a field programmable gate array, a digital signal processor, an application specific integrated circuit, a component, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

As one component of the operation unit 70, the digital camera 100 is provided with the touch panel 70a that is capable of detecting a contact on the display unit 28. The touch panel 70a and the display unit 28 can be integrally formed. For example, the touch panel 70a is configured so that the transmittance of light does not disturb the display of the display unit 28, and is attached to the upper layer of the display surface of the display unit 28. Then, the input coordinates on the touch panel 79a are associated with the display coordinates on the display unit 28. This enables configuring such a graphical user interface (GUI) that allows the user to have a feeling of directly operating the screen displayed on the display unit 28. The system control unit 50 can detect the following operations on the touch panel 70a and states thereof.

An operation to start touching the touch panel 70a with the finger or pen that has not been in contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to detach the finger or pen from the touch panel 70a to end touching (hereinafter referred to as a "touch-up")

A state where the finger or pen is not in contact with the touch panel 70a (hereinafter referred to as a "touch-off")

When a touch-down is detected, a touch-on is detected at the same time. After a touch-down is detected, a touch-on is normally kept being detected until a touch-up is detected. A touch-move is also detected in a state where a touch-on is detected. Even when a touch-on is detected, a touch-move is not detected if the touch position is not moving. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. Based on the notified information, the system control unit 50 determines what kind of a touch operation has been performed on the touch panel 70a. As for a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation has been performed. An operation to quickly move the finger over a certain distance while in contact with the touch panel 70a and then release the finger is referred to as a flick. In other words, a flick is an operation by the finger quickly touching and moving, like a quick swiping motion, on the surface of the touch panel 70a. When a touch-move at a predetermined speed or higher over a predetermined distance or longer is detected and then a touch-up is subsequently detected, it can be determined that a flick has been performed (a flick has been performed following a slide operation). A touch operation to simultaneously touch a plurality of positions (for example, two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70a may be of any one of various types including resistance film type, capacitance type, surface acoustic wave type, infrared-ray type, electromagnetic induction type, image recognition type, and optical sensor type. Although a touch is detected when the finger or pen comes in contact with the touch panel 70a or when the finger or pen comes close to the touch panel 70a depending on the type, either type is applicable.

Figure 3:
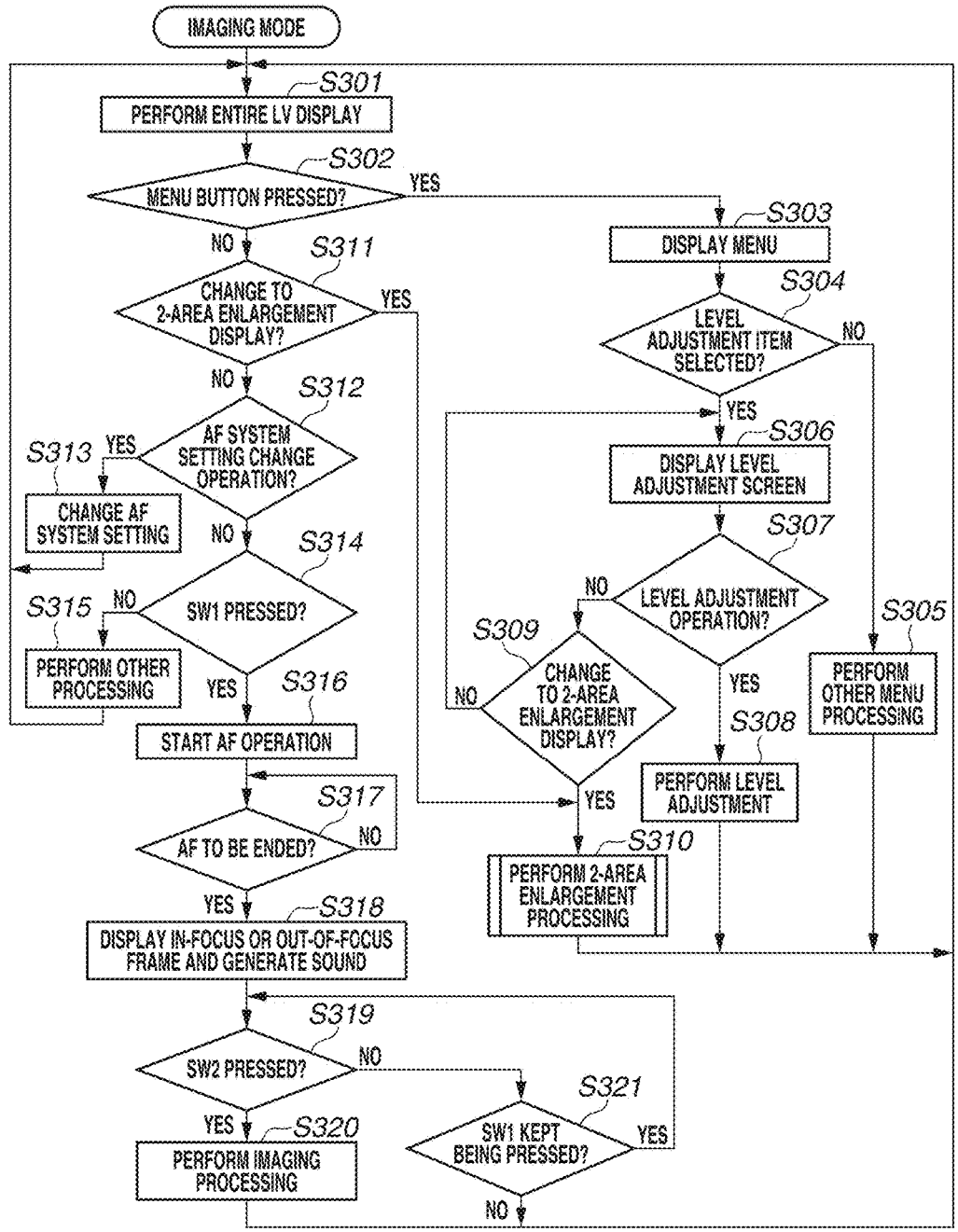
FIG. 3 is a flowchart illustrating imaging mode processing.

FIG. 3 is a flowchart illustrating processing during the imaging standby state of the digital camera 100. This processing is implemented when the system control unit 50 loads a program recorded in the nonvolatile memory 56 into the system memory 52 and then executes the program. When the digital camera 100 is activated in the imaging mode and then the live view imaging is turned ON, the digital camera 100 starts the processing illustrated in FIG. 3.

Figure 5A:
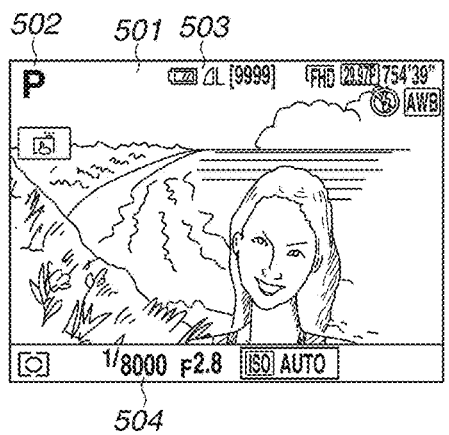
FIGS. 5A to 5F illustrate display examples in the imaging mode processing.
Figure 5D:
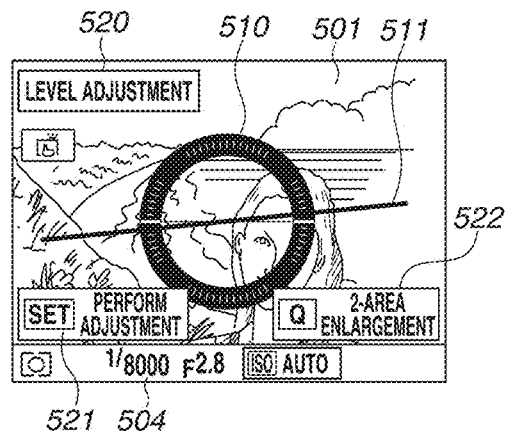
Figure 5B:
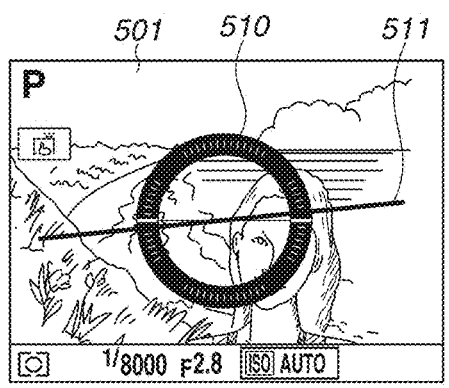

In step S301, the system control unit 50 displays an imaging standby screen on the display unit 28. FIG. 5A illustrates an example of the imaging standby screen. The imaging standby screen displays a live view image 501 (LV image 501) indicating the entire imaging range. An icon 502 indicating the current imaging mode and information display 503 related to imaging settings are superimposed on the LV image 501. FIG. 5B illustrates another example of the imaging standby screen displaying other information. It becomes possible to simply adjust the level of the camera 100 by superimposing a level 510 on the live view image 501. The level 510 is an electronic level indicating the orientation of the digital camera 100 with respect to the gravity direction detected by the orientation detection unit 55. More specifically, the level 510 is an orientation guide for guiding how much the orientation of the digital camera 100 differs from a reference orientation (horizontal orientation). The level 510 indicates the inclination of the lateral direction of the digital camera 100 (lateral direction of the imaging unit 22) with respect to the direction (horizontal direction or reference direction) perpendicular to the gravity direction. A horizontal image can be obtained by adjusting the orientation of the digital camera 100 so that this inclination becomes zero while viewing the level 510. More specifically, for the level 510, a line 511 which changes according to the orientation is displayed together with a circular scale fixedly displayed on the screen. The line 511 changes in display angle according to the inclination angle of the digital camera 100 in the gravity direction detected by the orientation detection unit 55. When the digital camera 100 is horizontally held (placed), i.e., when the horizontal direction of the digital camera 100 is perpendicular to the gravity direction), the line 511 is horizontally (laterally) displayed on the display unit 28. In other words, the angular deviation of the orientation of the digital camera 100 from the level is 0 degrees. A state where the digital camera 100 is horizontally held refers to a state where the angle of the digital camera 100 in the gravity direction detected by the orientation detection unit 55 is a reference angle indicating the level (a state where the digital camera 100 is in the reference orientation). The display state of the line 511 horizontally displayed is distinguishably differentiated from the display state of the line 511 not horizontally displayed. For example, the color of the line 511 horizontally displayed is differentiated from the color of the line 511 not horizontally displayed. When the angle of the digital camera 100 in the gravity direction detected by the orientation detection unit 55 is not the reference angle, the line 511 is obliquely displayed. Referring to the example illustrated in FIG. 5B, since the line 511 is obliquely displayed, the user can determine that the current orientation of the digital camera 100 is not level, i.e., the angle of the digital camera 100 in the gravity direction detected by the orientation detection unit 55 is not the reference angle). Normally, the line 511 obliquely displayed indicates that the orientation of the digital camera 100 is not level. Therefore, when the user wants to hold the digital camera 100 horizontally, the user adjusts the orientation of the digital camera 100 so that the line 511 is horizontally displayed with respect to the screen. However, if the level 510 deviates from the level because of an environmental factor such as temperature or a distortion of an exterior cover, the orientation of the digital camera 100 does not become level even after the user adjusts the orientation of the digital camera 100 so that the line 511 is horizontally displayed with respect to the screen. If the user notices this phenomenon, the user needs to perform the level adjustment (calibration) by adjusting level (described below). The display state of the level 510 is not limited to the display state illustrated in FIG. 5B. For example, an index may be displayed at a position on a horizontal linear scale. In such a case, the index is displayed at the center of the scale when level is determined, and the index is displayed at a position other than the center of the scale when level is not determined. Another display state can indicate the angle of elevation or angle of depression which are angular inclinations of the optical axis of the digital camera 100 (direction of the subject light incident to the imaging unit 22) with respect to the direction (horizontal direction) perpendicular to the gravity direction. The display state illustrated in FIG. 5A and the display state illustrated in FIG. 5B can be switched in response to the depression of the information selection button (INFO button) included in the operation unit 70. It is also possible to, in response to the depression of the information selection button, select a display state where the live view image 501 is displayed, and the icon 502, the information display 503 related to the imaging setting, and exposure information 504 are not displayed.

In step S302, the system control unit 50 determines whether the menu button 70e is pressed. When the menu button 70e is pressed (YES in step S302), the processing proceeds to step S303. On the other hand, when the menu button 70e is not pressed (NO in step S302), the processing proceeds to step S311.

Figure 5E:
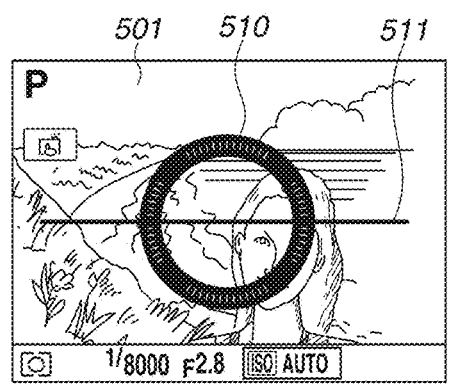
Figure 5C:
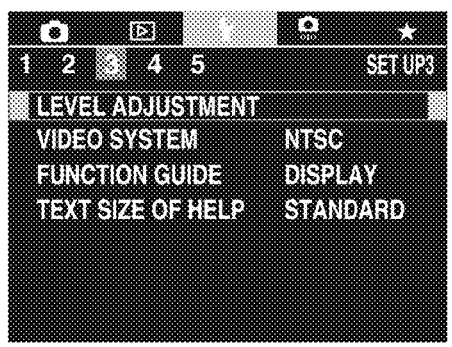

In step S303, the system control unit 50 displays the menu screen on the display unit 28. The menu screen allows the user to make various settings including imaging parameter settings, time settings, and language settings. FIG. 5C illustrates a display example of the menu screen. The menu screen displays a plurality of menu items including a menu item "Level Adjustment". The user can select an arbitrary menu item and make settings for the selected menu item.

In step S304, the system control unit 50 determines whether a menu item for level adjustment is selected out of a plurality of menu items displayed on the menu screen and then the determination operation (depression of the SET button 75) is performed. When the menu item for level adjustment is selected and determined (YES in step S304), the processing proceeds to step S306. On the other hand, when the menu item for level adjustment is not selected (NO in step S304), the processing proceeds to step S305. In step S305, the system control unit 50 performs processing corresponding to a menu item other than level adjustment, selected by the user, out of a plurality of menu items displayed on the menu screen.

In step S306, the system control unit 50 displays a level adjustment screen. FIG. 5D illustrates an example of the level adjustment screen. The level adjustment screen displays the level 510, a screen title 520, an adjustment execution icon 521, and a 2-area enlargement icon 522 which are superimposed on the entire LV image 501. Although the example illustrated in FIG. 5D includes exposure information 504, this information does not need to be displayed. The adjustment execution icon 521 is an operation guide (display item) which indicates that the adjustment of the level 510 is performed by pressing the SET button 75. The adjustment execution icon 521 also serves as a touch icon and therefore performs the level adjustment when a touch operation is performed on the adjustment execution icon 521. The 2-area enlargement icon 522 is an operation guide which indicates that the 2-area enlargement display (described below) can be performed by pressing the Q button 70c. The 2-area enlargement icon 522 is also a touch icon, and therefore changes the screen to the 2-area enlargement display when a touch operation is performed on the 2-area enlargement icon 522. By viewing the LV image 501, the user can confirm whether the level 510 correctly performs display for the actual level and then perform the level adjustment. The LV image 501 does not need to be displayed in the level adjustment screen for the following reason. When performing the level adjustment of the digital camera 100 by adjusting the orientation of the digital camera 100 to the level while monitoring the level 510 provided as an external accessory or provided on a tripod, it is not always necessary to perform the level adjustment by visually recognizing the LV image 501.

In step S307, the system control unit 50 determines whether a level adjustment execution operation is performed. When the SET button 75 is pressed or a touch (tap) operation is performed on the adjustment execution icon 521 (YES in step S307), the system control unit 50 determines that a level adjustment execution operation is performed. Then, the processing proceeds to step S308. On the other hand, when the operation is not performed (NO in step S307), the processing proceeds to step S309.

In step S308, the system control unit 50 performs the adjustment (calibration) of the level 510. More specifically, the system control unit 50 records the angle of the digital camera 100 in the gravity direction detected by the orientation detection unit 55 at this timing in the nonvolatile memory 56 as a reference angle. In other words, the system control unit 50 records the orientation detected by the orientation detection unit 55 at this timing in the nonvolatile memory 56 as the reference orientation (the angular deviation from the level is 0 degrees). In other words, further, based on the orientation detected by the orientation detection unit 55 at this timing, the system control unit 50 updates the reference orientation recorded in the nonvolatile memory 56. Subsequently, when the angle of the digital camera 100 in the gravity direction detected by the orientation detection unit 55 is the recorded reference angle (when the orientation detected by the orientation detection unit 55 is the reference orientation), the system control unit 50 determines that the digital camera 100 is level and horizontally displays the line 511 with respect to the screen. More specifically, the system control unit 50 displays that the deviation from the level is 0 degrees. When the angle of the digital camera 100 in the gravity direction detected by the orientation detection unit 55 differs from the recorded reference angle, the system control unit 50 displays the line 511 obliquely according to the difference from the reference angle. Then, the processing proceeds to step S301. When the level adjustment is performed in the state illustrated in FIG. 5D without changing the orientation of the digital camera 100, the system control unit 50 determines that the orientation at that timing is level and updates the display of the level 510 to the one indicating the level, as illustrated in FIG. 5E.

In step S309, the system control unit 50 determines whether an operation for changing to the 2-area enlargement display is performed. When the Q button 70c is pressed or a touch (tap) operation is performed on the 2-area enlargement icon 522 (YES in step S309), the system control unit 50 determines that an operation for changing to the 2-area enlargement display is performed. Then, the processing proceeds to step S310. On the other hand, when the operation is not performed (NO in step S309), the processing returns to step S306.

In step S310, the system control unit 50 performs the 2-area enlargement processing to perform the 2-area enlargement display. The 2-area enlargement processing will be described below with reference to FIG. 4. When performing the 2-area enlargement processing (YES in step S309), the system control unit 50 performs the 2-area enlargement display as the level adjustment screen. Therefore, in addition to the display items in the example screens illustrated in FIGS. 6A to 6F, the system control unit 50 displays the screen title 520 and the adjustment execution icon 521, as illustrated in FIG. 5F. The screen title 520 indicates that the 2-area enlargement display is performed as the level adjustment screen.

In step S311, the system control unit 50 determines whether an operation for changing to the 2-area enlargement display is performed. An operation for changing to the 2-area enlargement display refers to an operation for displaying the quick setting menu and selecting and determining a 2-area enlargement item included in the quick setting menu. More specifically, when the Q button 70c is pressed on the imaging standby screen, the system control unit 50 superimposes the quick setting menu on the live view image 501 on the display unit 28. The quick setting menu displays a group of icons arranged next to each other and indicating different items. A cursor is displayed on a selected icon. The cursor can be moved by performing a vertical movement operation with the cross key 74. When the SET button 75 is pressed with the cursor positioned at an icon indicating the 2-area enlargement item out of a plurality of items displayed in the quick setting menu, the system control unit 50 determines that an operation for changing to the 2-area enlargement display is performed. When an operation for changing to the 2-area enlargement display is performed (YES in step S311), the processing proceeds to step S310. In step S310, the system control unit 50 performs the 2-area enlargement processing. The 2-area enlargement processing will be described in detail below with reference to FIG. 4. On the other hand, when an operation for changing to the 2-area enlargement display is not performed (NO in step S311), the processing proceeds to step S312.

In step S312, the system control unit 50 determines whether an AF system setting change operation is performed. When an AF system setting change operation is performed (YES in step S312), the processing proceeds to step S313. On the other hand, when an AF system setting change operation is not performed (NO in step S312), the processing proceeds to step S314. In step S313, based on the user operation detected in step S312, the system control unit 50 changes and sets the AF system (stores the AF system setting in the system memory 52 or the nonvolatile memory 56). According to the present exemplary embodiment, AF systems which can be set in step S313 include the 1-point system (1-point AF) in which AF is performed on one point set by the user, the Ai-AF system in which the AF position is automatically determined, and the face AF in which AF is performed on a face detected from the LV image.

In step S314, the system control unit 50 determines whether the shutter button 61 is half-pressed and SW1 is set to ON. When SW1 is set to ON (YES in step S314), the processing proceeds to step S316. On the other hand, when SW1 is not set to ON (NO in step S314), the processing proceeds to step S315.

In step S315, the system control unit 50 performs other processing. Other processing includes changing various imaging settings (diaphragm value, shutter speed, exposure correction, image quality settings, self-timer imaging ON/OFF, stroboscope ON/OFF, etc.) in response to an operation, and includes display switching in response to the above-described information selection button (INFO button) operation.

In step S316, the system control unit 50 performs AF. In addition to AF, the system control unit 50 also performs imaging preparation processing such as automatic exposure (AE) according to settings. In step S317, the system control unit 50 determines whether AF is completed. When AF is completed (YES in step S317), the processing proceeds to step S318. In step S318, the system control unit 50 displays an execution result of AF. More specifically, when the in-focus state is obtained as a result of AF, the system control unit 50 displays an in-focus frame on the main subject as a display to be made when the in-focus state is obtained. The in-focus frame differs in display state, such as color, from a face frame displayed during the imaging standby state. Therefore, the in-focus frame is displayed in a form such that the user can recognize it as an in-focus frame. The system control unit 50 also generates sound indicating the in-focus state is obtained (in-focus sound) from a speaker (not illustrated). If focusing fails (out-of-focus state), the system control unit 50 displays an out-of-focus frame different from an in-focus frame and generates sound indicating the out-of-focus state from a speaker (not illustrated).

In step S319, the system control unit 50 determines whether the shutter button 61 is fully pressed and SW2 is set to ON. When SW2 is set to ON (YES in step S319), the processing proceeds to step S320. On the other hand, when SW2 is not set to ON (NO in step S319), the processing proceeds to step S321. In step S320, according to the ON state of SW2, the system control unit 50 performs the above-described imaging processing (a series of operations in the imaging processing from signal reading from the imaging unit 22 to image file writing in the recording medium 200). When the quick review is set to ON, the system control unit 50 automatically displays an image that has just been captured after the imaging processing on the display unit 28 for a predetermined time period, allowing the user to confirm the imaging. Upon completion of the imaging processing, the processing returns to step S301. In step S321, the system control unit 50 determines whether the half-pressed state of the shutter button 61 (ON state of SW1) is maintained. When the ON state of SW1 is maintained (YES in step S321), the processing returns to step S319. On the other hand, when the ON state of SW1 is not maintained, i.e., the half-pressed state of the shutter button 61 is canceled (NO in step S321), the processing returns to step S301.

Figure 4:
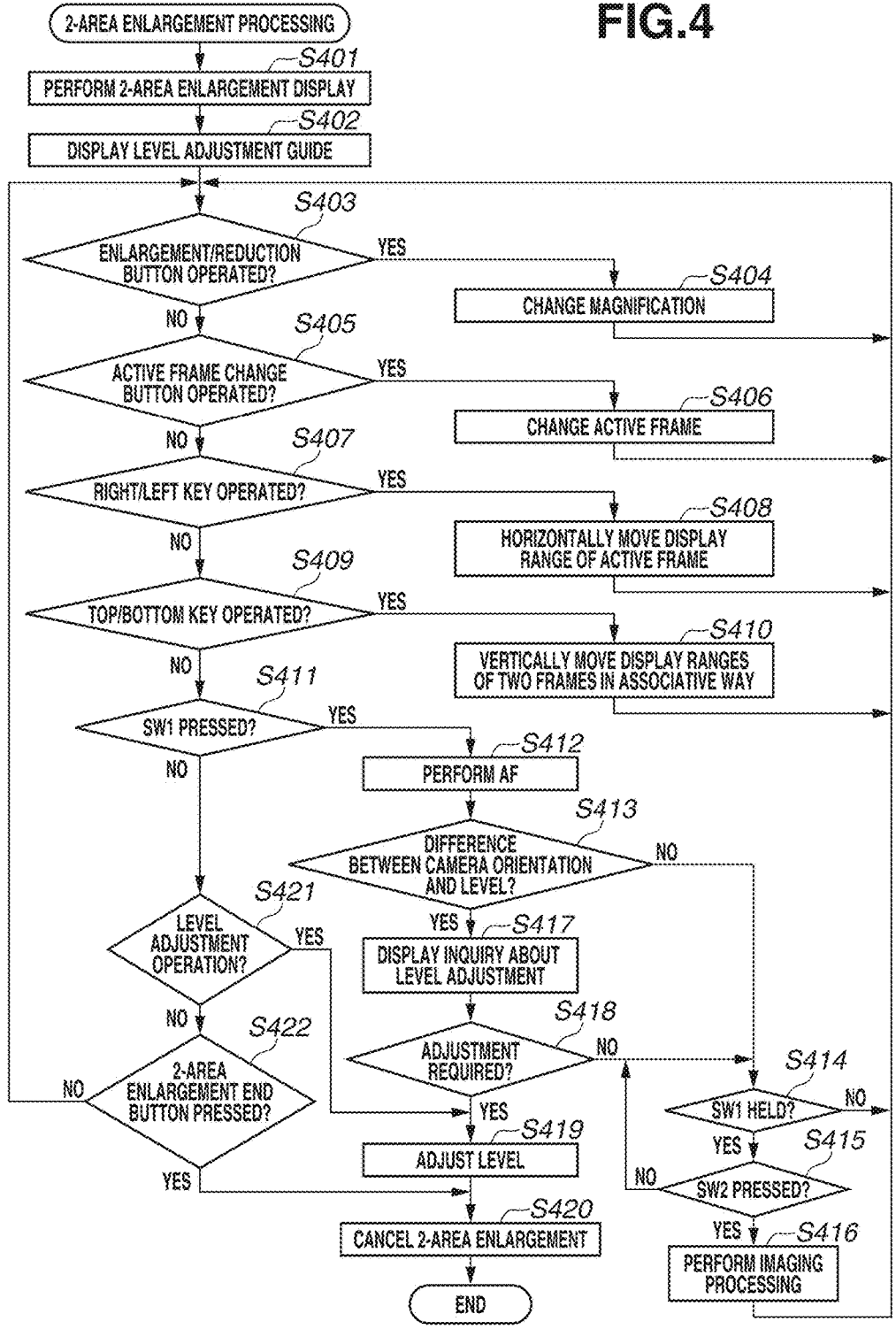
FIG. 4 is a flowchart illustrating 2-area enlargement processing.
Figure 5F:
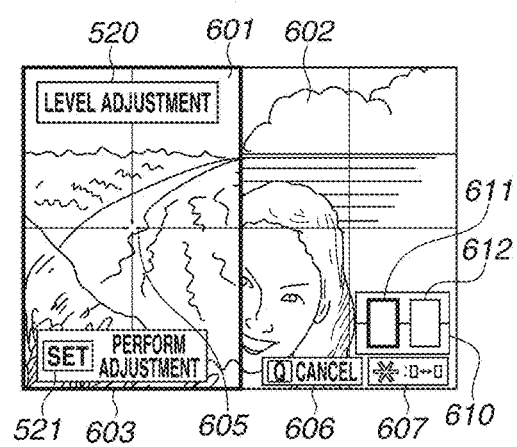

FIG. 4 is a flowchart illustrating details of the above-described 2-area enlargement processing in step S310. This processing is implemented when the system control unit 50 loads a program recorded in the nonvolatile memory 56 into the system memory 52 and then executes the program.

Figure 6A:
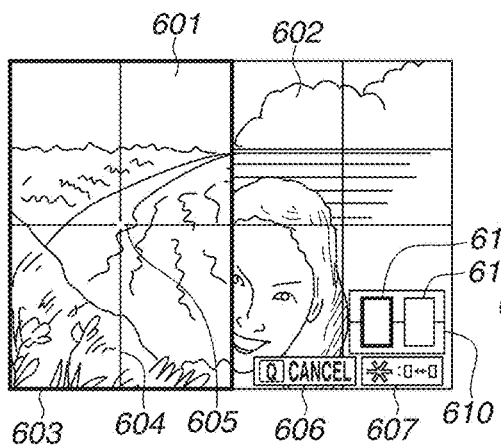
FIGS. 6A to 6F illustrate display examples in the 2-area enlargement processing.

In step S401, the system control unit 50 performs the 2-area enlargement display on the display unit 28. An example of a 2-area enlargement display screen is illustrated in FIG. 6A. In the 2-area enlargement display, the system control unit 50 displays side by side the live view images of two areas separated from each other in the lateral direction (horizontal direction) or in the up and down direction (vertical direction). FIG. 6A illustrates an example of the live view images of two areas separated from each other in the horizontal direction displayed side by side on one screen. A left side area 601 is a display area for displaying the live view image currently being captured in a part of the left side area of the imaging unit 22. A right side area 602 is a display area for displaying the live view image currently being captured in a part of the right side area of the imaging unit 22. The live view images displayed in the left side area 601 and the right side area 602 have the same height in the imaging unit 22. An active frame 603 is a selection frame indicating the current operation target area (active area) out of the left side area 601 and the right side area 602. Referring to FIG. 6A, the active frame 603 is displayed on the left side area 601, indicating that the left side area 601 is the current target of right and left movements and AF. Auxiliary lines 604 are displayed at the horizontal and vertical centers of the left side area 601. The intersection of the auxiliary lines 604 is the center of the left side area 601. Likewise, auxiliary lines are displayed at the horizontal and vertical centers of the right side area 602. A center marker 605, a marker displayed on the active frame side, indicates the center of the left side area 601 as an active frame. The auxiliary lines 604 and the center marker 605 are not displayed at the center of the active frame to allow the user to confirm the subject positioned at the center. A guide 606 is a guidance display indicating an operation member (operation method) for canceling the 2-area enlargement display. A guide 607 is a guidance display indicating an operation member (operation method) for switching the active frame. An enlarged position guide 610 indicates the portions currently enlarged as the left side area 601 and the right side area 602 in the entire imaging range (the entire live view image captured by the imaging unit 22 or the entire imaging range reflected in a still image captured according to an imaging instruction). In other words, the enlarged position guide 610 indicates the positions and sizes of the two imaging areas respectively corresponding to the left side area 601 and the right side area 602 relative to the entire imaging range. A left side indicator 611 indicates the range of the live view image displayed in the left side area 601 relative to the entire imaging range. The right side indicator 612 indicates the range of the live view image displayed in the right side area 602 relative to the entire imaging range. To indicate that the active frame 603 is displayed in the left side area 601, the left side indicator 611 is displayed with a different color or thickness from the right side indicator 612. The guides 606 and 607 and the enlarged position guide 610 are superimposed on the live view image of the area without the active frame 603 (non-active frame) so that these guides do not disturb the visual recognition of the live view image of the area with the active frame 603.

In step S402, the system control unit 50 displays the operation guide for adjusting the level 510. For example, the system control unit 50 superimposes a message "Level adjustment can be performed with SET Button" on the 2-area enlargement display screen illustrated in FIG. 6A for a predetermined time period (for example, 6 seconds) since the 2-area enlargement display is started. This message disappears when the predetermined time period has elapsed. This allows the user to know that, after horizontally adjusting the orientation of the camera 100 to the horizon through the 2-area enlargement display, the level adjustment (calibration) can also be performed together. When the 2-area enlargement display is started as the above-described level adjustment screen, i.e., when performing the 2-area enlargement processing (YES in step S309), the system control unit 50 displays the screen title 520 and the adjustment execution icon 521 in addition to the operation guide displayed only for a predetermined time period, as illustrated in FIG. 5F. The screen title 520 indicates that the 2-area enlargement display is being performed as the level adjustment screen. The screen title 520 and the adjustment execution icon 521 do not disappear even when the predetermined time period has elapsed but remains displayed while the 2-area enlargement display as the level adjustment screen is being performed. More specifically, although not illustrated in the example screens in FIGS. 6A to 6F, the screen title 520 and the adjustment execution icon 521 are also additionally displayed on the example screens in FIGS. 6A to 6F when performing the 2-area enlargement processing (YES in step S309). When the 2-area enlargement display is started without selecting a menu item for the level adjustment, i.e., when performing the 2-area enlargement processing (YES in step S311), the screen title 520 and the adjustment execution icon 521 are not displayed.

In step S403, the system control unit 50 determines whether either the enlargement button 77 or the reduction button 78 is pressed (enlargement/reduction instruction). When either the enlargement button 77 or the reduction button 78 is pressed (YES in step S403), the processing proceeds to step S404. On the other hand, when neither the enlargement button 77 nor the reduction button 78 is pressed (NO in step S403), the processing proceeds to step S405.

Figure 6D:
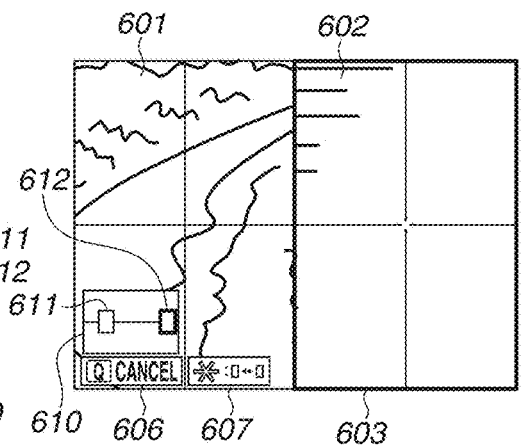
Figure 6B:
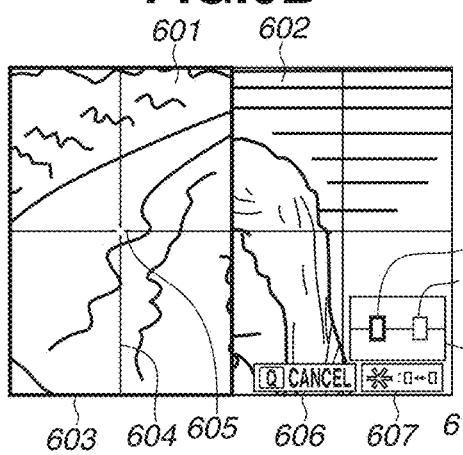

In step S404, the system control unit 50 changes the magnifications of the LV images displayed with 2-area enlargement by an operation. When the enlargement button 77 is pressed, the system control unit 50 increases the respective magnifications of the LV images displayed in the left side area 601 and the right side area 602 and makes the magnifications identical (enlarges the LV images displayed in the left side area 601 and the right side area 602 in an associative way). When the reduction button 78 is pressed, the system control unit 50 decreases the respective magnifications of the LV images displayed in the left side area 601 and the right side area 602 and makes the magnifications identical. The system control unit 50 records the changed magnifications in the system memory 52. Even after the 2-area enlargement display is once canceled, when the 2-area enlargement display is performed again without turning power OFF, the system control unit 50 displays the two LV images with the same magnifications. FIG. 6B illustrates an example screen when the LV images are enlarged by pressing the enlargement button 77 in the state illustrated in FIG. 6A. The live view images displayed in the left side area 601 and the right side area 602 illustrated in FIG. 6B are larger than the respective live view images illustrated in FIG. 6A. The display ranges relative to the entire imaging range decreases according to the degree of enlargement. Therefore, the left side indicator 611 and the right side indicator 612 displayed in the enlarged position guide 610 illustrated in FIG. 6B are smaller than respective indicators illustrated in FIG. 6A.

In step S405, the system control unit 50 determines whether the active frame change button 70d is pressed. When the active frame change button 70d is pressed (YES in step S405), the processing proceeds to step S406. On the other hand, when the active frame change button 70d is not pressed (NO in step S405), the processing proceeds to step S407.

Figure 6E:
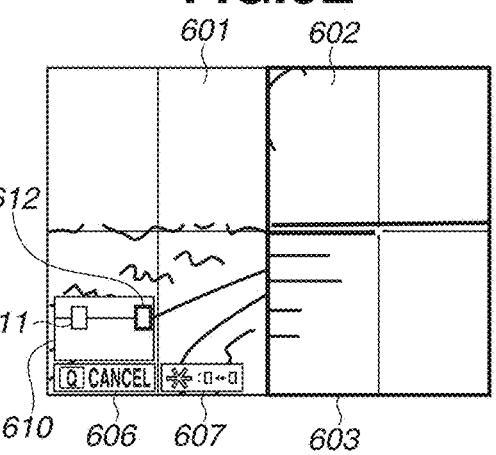
Figure 6C:
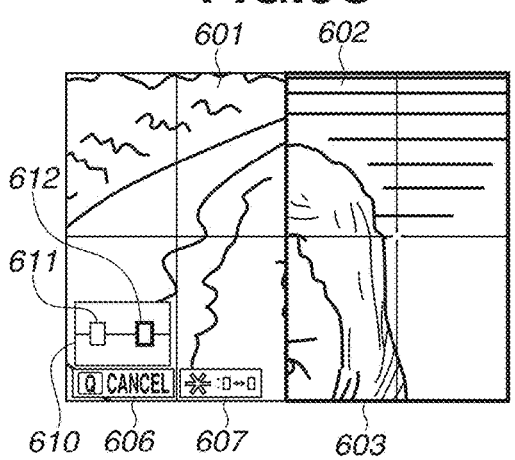

In step S406, the system control unit 50 moves the active frame 603 from the area where the active frame 603 has been positioned before the operation to the other area. FIG. 6C illustrates an example screen when the active frame change button 70d is pressed in the state illustrated in FIG. 6B and the active frame 603 is moved. The active frame 603 positioned on the left side area 601 as illustrated in FIG. 6B has moved to the right side area 602 as illustrated in FIG. 6C. In addition, the guides 606 and 607 and the enlarged position guide 610 have been moved to a position in the left side area 601 as the non-active frame in a superimposed manner.

In step S407, the system control unit 50 determines whether the right/left key of the cross key 74 is operated. When the right/left key is operated (YES in step S407), the processing proceeds to step S408. On the other hand, when the right/left key is not operated (NO in step S407), the processing proceeds to step S409.

In step S408, in response to operation of the right/left key, the system control unit 50 horizontally moves the display range of the area displayed with the active frame 603. More specifically, when the left key is pressed, the system control unit 50 moves the display range of the area displayed with the active frame 603 towards the left. When the right key is pressed, the system control unit 50 moves the display range of the area displayed with the active frame 603 towards the right. FIG. 6D illustrates an example screen when the right key is pressed several times in the state illustrated in FIG. 6C. Referring to FIG. 6D, the enlargement area displayed with the active frame 603 in the right side area 602 is moved further to the right in the imaging range than in the state illustrated in FIG. 6C (i.e., the image itself scrolls to the left). At this timing, the display range of the left side area 601 as the non-active frame remains unchanged (when the left side area 601 and the right side area 602 do not adjoin each other, the respective horizontal movements are performed not in an associative way). Referring to the enlarged position guide 610 illustrated in FIG. 6D, the right side indicator 612 is moved further to the right than in the state illustrated in FIG. 6C to indicate that the display range of the right side area 602 has further moved towards the right. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges. In a case where the right end of the display range of the left side area 601 adjoins the left end of the display range of the right side area 602, even if the active frame 603 is on the left side area 601, the system control unit 50 moves both of the display ranges of the left side area 601 and the right side area 602 to the right in an associative way in response to an instruction for further movement to the right. However, when the right side area 602 has reached the right end of the entire imaging range, the display ranges cannot be moved any further to the right, so that the system control unit 50 does not move the display ranges even if an instruction for further movement to the right is issued. On the contrary, in a case where the left end of the display range of the right side area 602 adjoins the right end of the display range of the left side area 601, even if the active frame 603 is on the right side area 602, the system control unit 50 moves both of the display ranges of the left side area 601 and the right side area 602 to the left in response to an instruction for further movement to the left. However, when the left side area 601 has reached the left end of the entire imaging range, the display ranges cannot be moved any further to the left, so that the system control unit 50 does not move the display ranges even if an instruction for further movement to the left is issued.

In step S409, the system control unit 50 determines whether the top/bottom key of the cross key 74 is operated. When the top/bottom key is operated (YES in step S409), the processing proceeds to step S410. On the other hand, when the top/bottom key is not operated (NO in step S409), the processing proceeds to step S411.

In step S410, in response to the operation of the top/bottom key, the system control unit 50 vertically moves the display ranges of the left side area 601 and the right side area 602 in an associative way. More specifically, when the upper key is pressed, the system control unit 50 moves up the display ranges of the left side area 601 and the right side area 602 in an associative way. When the lower key is pressed, the system control unit 50 moves down the display ranges of the left side area 601 and the right side area 602 in an associative way. FIG. 6E illustrates an example screen when the upper key is pressed several times in the state illustrated in FIG. 6D. Referring to FIG. 6E, the display ranges of the left side area 601 and the right side area 602 are moved further upward in the imaging range than in the state illustrated FIG. 6D (i.e., the image itself scrolls down). Referring to the enlarged position guide 610 illustrated in FIG. 6E, the left side indicator 611 and the right side indicator 612 are moved further upward than in the state illustrated in FIG. 6D to indicate that the display ranges of the left side area 601 and the right side area 602 have moved further upward. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges.

Figure 6F:
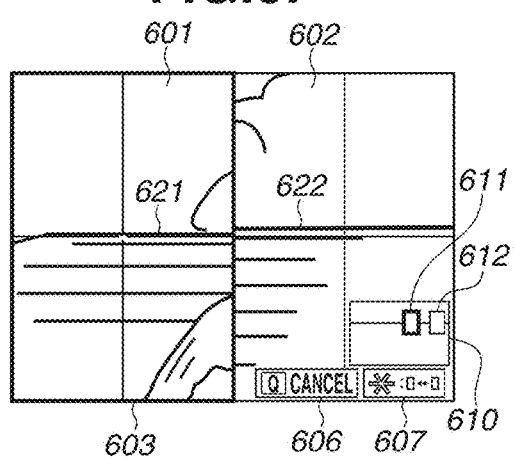

After repeating the above-described operations to set display ranges for the 2-area enlargement display at two separate positions based on the horizon, a horizontal outline of a building, etc., the user can capture a subject image with the line of the subject horizontally reflected by imaging the subject after adjusting the orientation of the camera 100 to align the lines of the subject in the left side area 601 and the right side area 602. FIG. 6F illustrates an example screen at the time of the 2-area enlargement display, in which the left side area 601 is set to a subject portion including a horizon 621 and the right side area 602 is set to a subject portion including a horizon 622 at a position separate from that of the horizon 621. Although the horizons 621 and 622 are actually a straight line, in the example illustrated in FIG. 6F, the horizon 621 in the left side area 601 and the horizon 622 in the right side area 602 cannot be recognized as one straight line but are slightly mismatched. By monitoring such a display, the user can recognize that the digital camera 100 is not horizontally held. The user can capture an image in which the horizontal line is horizontally reflected by imaging a subject after adjusting the orientation of the digital camera 100 to an orientation with which the horizons 621 and 622 can be visually recognized as one straight line. Further, the level 510 can be adjusted (calibrated) by adjusting the orientation of the digital camera 100 to an orientation with which the horizons 621 and 622 can be visually recognized as one straight line, and then pressing the SET button 75. Therefore, even without an external accessory level or a tripod with a level, using the 2-area enlargement display enables adjusting the level (orientation guide) of the camera 100 with good accuracy in an environment where a horizontal subject (such as the horizon) can be imaged.

In step S411, the system control unit 50 determines whether the shutter button 61 is half-pressed and SW1 is set to ON. When SW1 is set to ON (YES in step S411), the processing proceeds to step S412. On the other hand, when SW1 is not set to ON (NO in step S411), the processing proceeds to step S421.

In step S412, the system control unit 50 performs an imaging preparation operation such as AF and AE without canceling the 2-area enlargement display. As for AF, the system control unit 50 performs AF on the center portion of the active frame 603 (position indicated by the center marker 605). When the in-focus state is obtained as a result of AF, focus is fixed (AF lock) while the ON state of SW1 is maintained.

In step S413, the system control unit 50 determines whether the difference between the current orientation of the digital camera 100 (the angle of the digital camera 100 in the gravity direction detected by the orientation detection unit 55) and the reference angle with which the level 510 is to indicate level (the reference orientation recorded in the nonvolatile memory 56) is equal to or larger than a predetermined threshold value. When the difference is equal to or larger than the threshold value (YES in step S413), the processing proceeds to step S417. On the other hand, when the difference is smaller than the threshold value (NO in step S413), the processing proceeds to step S414.

In step S414, the system control unit 50 determines whether the ON state of SW1 is maintained. When the ON state of SW1 is maintained (YES in step S414), the processing proceeds to step S415. On the other hand, when the ON state of SW1 is not maintained (NO in step S414), the system control unit 50 cancels the auto focus lock state. Then, the processing returns to step S403.

In step S415, the system control unit 50 determines whether the shutter button 61 is fully pressed and SW2 is set to ON. When SW2 is set to ON (YES in step S415), the processing proceeds to step S416. On the other hand, when SW2 is not set to ON (NO in step S415), the processing returns to step S414.

In step S416, the system control unit 50 performs the above-described imaging processing (a series of operations in the imaging processing from signal reading from the imaging unit 22 to image file writing in the recording medium 200). The image to be captured by the imaging processing is not an image in the range subjected to the 2-area enlargement display but an image in the imaging range. Upon completion of the imaging processing, the processing returns to step S403. When the imaging processing is completed, the processing may not return to step S403, and the system control unit 50 may cancel the 2-area enlargement display and return to the live view display (non-scaled display) over the entire imaging range (in other words, the processing may proceed to step S301).

In step S417, the system control unit 50 performs display for making an inquiry about the necessity of adjusting the level 510 on the display unit 28. For example, the system control unit 50 displays a message "Camera orientation is different from levelness of level. Will you adjust levelness of level?" together with the "YES (Adjustment)" and "NO (No Adjustment)" options allowing the user to select one of the options. If the user fully presses the shutter button 61 without selecting "NO", the user can perform imaging without adjusting the level 510. Therefore, the system control unit 50 may display only an operation guide "SET: Adjust Level" without displaying the "NO" option. The 2-area enlargement display is a function of imaging after adjusting the orientation of the camera 100 to the level by using a subject to be displayed as a live view image. However, the difference between the reference angle with which the level 510 indicates the level and the orientation of the digital camera 100 in step S412 means that the reference angle of the level 510 does not respond to the horizontal orientation adjusted through the 2-area enlargement display. Therefore, in step S414, the system control unit 50 performs display for making an inquiry about whether to adjust the level 510 based on the current orientation of the digital camera 100. According to the present exemplary embodiment, when the system control unit 50 determines that the camera orientation is largely different from the reference angle at the timing when the shutter button 61 is half-pressed and AF is performed, the system control unit 50 performs display for making an inquiry about the necessity of adjusting the level 510 in this way. This is because the half-pressing of the shutter button 61 is considered to be an operation to be performed after the user completes the orientation adjustment for the digital camera 100. The timing of determining the difference of the camera orientation from the reference angle and performing display screen for making an inquiry about the necessity of adjusting the level 510 is not limited to the timing of half-pressing the shutter button 61. This timing may be a timing when other operation is performed or other timings as long as the orientation adjustment for the digital camera 100 by the user through the 2-area enlargement display can be considered to have been completed. The system control unit 50 may perform the processing in steps S412 and S417 before AF is performed in step S413 in response to the half-pressing of the shutter button 61.

In step S418, the system control unit 50 determines whether a level adjustment operation is performed in a state where an inquiry about the necessity of adjusting the level 510 is displayed. When an operation of selecting and determining "YES (Adjustment)" displayed with an inquiry about the necessity of adjusting the level 510 is performed or when the SET button 75 is pressed (YES in step S418), the processing proceeds to step S419. On the other hand, when such an operation is not performed (NO in step S418), the processing proceeds to step S414.

In step S419, the system control unit 50 performs the adjustment (calibration) of the level 510 based on the orientation detected at this timing. This processing is similar to the above-described processing in step S308.

In step S420, the system control unit 50 cancels (ends) the 2-area enlargement display and returns to the entire live view image. Then, the processing proceeds to step S301 illustrated in FIG. 3. In step S301, the system control unit 50 displays the entire live view image.

In step S421, the system control unit 50 determines whether a level adjustment operation is performed. When the SET button 75 is pressed, the system control unit 50 determines that a level adjustment operation is performed (YES in step S421), the processing proceeds to step S419. In step S419, the system control unit 50 performs the adjustment of the level 510. On the other hand, when a level adjustment operation is not performed (NO in step S421), the processing proceeds to step S422. An operation for instructing a level adjustment may be received only when the 2-area enlargement display is performed from the above-described level adjustment screen, and the operation may not be received when the normal 2-area enlargement display is performed. More specifically, in the normal 2-area enlargement display, the system control unit 50 may not perform the adjustment of the level 510 even when the SET button 75 is pressed. The case where the 2-area enlargement display is performed in the above-described level adjustment screen refers to a case where the determination result is YES in step S309 and then the 2-area enlargement processing is being performed. The case of the normal 2-area enlargement display refers to a case where the determination result is YES in step S311 and then the 2-area enlargement processing is being performed.

In step S422, the system control unit 50 determines whether a 2-area enlargement end button is pressed. According to the present exemplary embodiment, the 2-area enlargement end button refers to the Q button 70c. When the Q button 70c is pressed (YES in step S422), the processing proceeds to step S420. On the other hand, when the Q button 70c is not pressed (NO in step S422), the processing returns to step S403. Then, the system control unit 50 repeats the subsequent processing.

In the above-described 2-area enlargement processing, the level 510 can be adjusted (the reference orientation can be set) after the orientation of the camera 100 has been adjusted to the horizontal orientation according to a horizontal subject through the 2-area enlargement display, so that the level 510 can be accurately adjusted. Even without an external level, using the 2-area enlargement display enables adjusting the level 510 (orientation guide) of the camera 100 with good accuracy in an environment where a horizontal subject (such as the horizon) can be imaged.

Even with an external level, using the 2-area enlargement display may enable adjusting the orientation of the camera 100 to the level and adjusting the level of the camera 100 with better accuracy than using the external level depending on the external level. For example, although a bubble-tube-type level (leveling machine) is known, it is difficult, depending on the structure, to visually determine whether air bubbles are positioned exactly at the center of the bubble tube. In this case, even if the user determines that the camera 100 is level based on the position of air bubbles, there may be a certain amount of error from the level. Visually determining whether the horizons 621 and 622 are matched as described above in the 2-area enlargement display may be easier and more accurate, and may enable adjusting the orientation of the camera 100 to the level with better accuracy than using a bubble-tube-level.

Once the orientation guide of the camera is adjusted with good accuracy, using the orientation guide (level display) of the camera 100 enables adjusting the orientation of the digital camera 100 with good accuracy even in an imaging scene where the level adjustment with the 2-area enlargement display is difficult. Imaging scenes where the level adjustment with the 2-area enlargement display is difficult includes an imaging scene where there is no subject with which the horizon can be confirmed.

The above-described various control processing to be performed by the system control unit 50 may be performed by one hardware component, and the entire apparatus may be controlled by a plurality of hardware components which share processing.

While the present disclosure has specifically been described based on exemplary embodiments, the present disclosure is not limited thereto but can be modified in diverse ways without departing from the spirit and scope thereof. The above-described exemplary embodiments are to be considered as illustrative and not restrictive of the scope of the present disclosure. These exemplary embodiments can be suitably combined.

Although, in the above-described exemplary embodiments, the present disclosure is applied to the digital camera 100, the present disclosure is not limited thereto. The present disclosure is also applicable to an imaging control apparatus capable of performing the 2-area enlargement display. More specifically, the present disclosure is applicable to a personal computer and a personal digital assistant (PDA) having a camera function, a mobile phone terminal with a camera, a portable image viewer with a camera, a music player with a camera, a game machine with a camera, an electronic book reader with a camera, and so on. The present disclosure is also applicable to a tablet terminal with a camera, a smart phone with a camera, a household appliance and onboard apparatus having a camera function and a display. The present disclosure is also applicable to a smart phone, a tablet personal computer (PC), a desktop PC, etc. which receive and display a live view image captured by a digital camera, etc. via wired or wireless communication and remotely controls the digital camera (including a network camera).

According to the present disclosure, an orientation guide can be adjusted with good accuracy.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-025383, filed Feb. 14, 2017, which is hereby incorporated by reference herein in its entirety.

What is claimed is:

1. An imaging apparatus comprising:
   an orientation detector configured to detect an orientation of the imaging apparatus; and
   at least one memory and at least one processor which function as:
   a control unit configured to perform control to display an orientation guide for indicating an orientation of the imaging apparatus based on the orientation detected by the orientation detector;
   a display control unit configured to perform control to perform 2-area enlargement display for displaying live view images captured in two different areas horizontally or vertically separated from each other by an imaging unit, side by side on a display unit; and
   an adjustment unit configured, to, upon reception of a specific operation while the 2-area enlargement display is being performed, adjust a reference of the orientation guide based on the orientation detected by the orientation detector when the specific operation is received,
   wherein the orientation guide is a display for indicating a difference between the orientation detected by the orientation detector and a pre-recorded reference orientation, and
   wherein the adjustment unit updates and records the reference orientation based on the orientation detected by the orientation detector when the specific operation is received.

2. The imaging apparatus according to claim 1, wherein the display control unit is capable of performing the 2-area enlargement display as an adjustment screen for the orientation guide displayed through selection of a menu item for the orientation guide adjustment out of a plurality of menu items in a menu screen for performing various settings related to the imaging apparatus.

3. The imaging apparatus according to claim 2, wherein the display control unit is also capable of performing the 2-area enlargement display not through the selection of the menu item for the orientation guide adjustment from an imaging standby screen displaying live view images.

4. The imaging apparatus according to claim 3, wherein the display control unit performs control,
   when performing the 2-area enlargement display as the adjustment screen for the orientation guide, to display a display item related to the orientation guide adjustment in the 2-area enlargement display, and
   when performing the 2-area enlargement display not through the selection of the menu item for the orientation guide adjustment, not to display the display item in the 2-area enlargement display.

5. The imaging apparatus according to claim 3, wherein, while the 2-area enlargement display is being performed not through the selection of the menu item for the orientation guide adjustment, adjustment by the adjustment unit is not performable.

6. The imaging apparatus according to claim 1, wherein the display control unit performs control to display a guidance related to the specific operation when starting the 2-area enlargement display.

7. The imaging apparatus according to claim 6, wherein the display control unit performs control to hide the guidance related to the specific operation when a predetermined time period has elapsed since the start of the display.

8. The imaging apparatus according to claim 1, wherein, in a case where a difference between the orientation detected by the orientation detector and an orientation stored as a reference orientation of the orientation guide is equal to or greater than a threshold value when a predetermined operation is performed while the 2-area enlargement display is being performed, the display control unit performs control to perform display for adjusting a reference of the orientation guide.

9. The imaging apparatus according to claim 8, wherein the predetermined operation is an operation for instructing to perform at least one of auto focus and auto exposure.

10. The imaging apparatus according to claim 8, wherein the predetermined operation is an operation on a shutter button.

11. The imaging apparatus according to claim 1, wherein the orientation guide is a level display for indicating whether the imaging apparatus is horizontally held.

12. A method for controlling an imaging apparatus having an orientation detector for detecting an orientation of the imaging apparatus, the method comprising:
- performing control to display an orientation guide for indicating an orientation of the imaging apparatus based on the orientation detected by the orientation detector;
- performing display control to perform 2-area enlargement display for displaying live view images captured in two different areas horizontally or vertically separated from each other by an imaging unit, side by side on a display unit; and
- adjusting, upon reception of a specific operation while the 2-area enlargement display is being performed, a reference of the orientation guide based on the orientation detected by the orientation detector when the specific operation is received,
- wherein the orientation guide is a display for indicating a difference between the orientation detected by the orientation detector and a pre-recorded reference orientation, and
- wherein the adjusting updates and records the reference orientation based on the orientation detected by the orientation detector when the specific operation is received.

13. A non-transitory computer-readable storage medium storing a program for causing a computer to execute a method for controlling an imaging apparatus having an orientation detector for detecting an orientation of the imaging apparatus, the method comprising:
- performing control to display an orientation guide for indicating an orientation of the imaging apparatus based on the orientation detected by the orientation detector;
- performing display control to perform 2-area enlargement display for displaying live view images captured in two different areas horizontally or vertically separated from each other by an imaging unit, side by side on a display unit; and
- adjusting, upon reception of a specific operation while the 2-area enlargement display is being performed, a reference of the orientation guide based on the orientation detected by the orientation detector when the specific operation is received,
- wherein the orientation guide is a display for indicating a difference between the orientation detected by the orientation detector and a pre-recorded reference orientation, and
- wherein the adjusting updates and records the reference orientation based on the orientation detected by the orientation detector when the specific operation is received.

14. An imaging apparatus comprising:
- an orientation detector configured to detect an orientation of the imaging apparatus; and
- at least one memory and at least one processor which function as:
- a control unit configured to perform control to display an orientation guide for indicating an orientation of the imaging apparatus based on the orientation detected by the orientation detector;
- a display control unit configured to perform control to perform 2-area enlargement display for displaying live view images captured in two different areas horizontally or vertically separated from each other by an imaging unit, side by side on a display unit; and
- an adjustment unit configured to, upon reception of a specific operation while the 2-area enlargement display is being performed, adjust a reference of the orientation guide based on the orientation detected by the orientation detector when the specific operation is received,
- wherein the display control unit is capable of performing the 2-area enlargement display as an adjustment screen for the orientation guide displayed through selection of a menu item for the orientation guide adjustment out of a plurality of menu items in a menu screen for performing various settings related to the imaging apparatus,
- wherein the display control unit is also capable of performing the 2-area enlargement display not through the selection of the menu item for the orientation guide adjustment from an imaging standby screen displaying live view images,
- wherein the display control unit performs control,
- when performing the 2-area enlargement display as the adjustment screen for the orientation guide, to display a display item related to the orientation guide adjustment in the 2-area enlargement display, and
- when performing the 2-area enlargement display not through the selection of the menu item for the orientation guide adjustment, not to display the display item in the 2-area enlargement display.

15. A method for controlling an imaging apparatus having an orientation detector for detecting an orientation of the imaging apparatus, the method comprising:
- performing control to display an orientation guide for indicating an orientation of the imaging apparatus based on the orientation detected by the orientation detector;
- performing display control to perform 2-area enlargement display for displaying live view images captured in two different areas horizontally or vertically separated from each other by an imaging unit, side by side on a display unit; and
- adjusting, upon reception of a specific operation while the 2-area enlargement display is being performed, a reference of the orientation guide based on the orientation detected by the orientation detector when the specific operation is received,
- wherein the display control is capable of performing the 2-area enlargement display as an adjustment screen for the orientation guide displayed through selection of a menu item for the orientation guide adjustment out of a plurality of menu items in a menu screen for performing various settings related to the imaging apparatus,
- wherein the display control is also capable of performing the 2-area enlargement display not through the selection of the menu item for the orientation guide adjustment from an imaging standby screen displaying live view images,
- wherein the display control performs control,
- when performing the 2-area enlargement display as the adjustment screen for the orientation guide, to display a display item related to the orientation guide adjustment in the 2-area enlargement display, and
- when performing the 2-area enlargement display not through the selection of the menu item for the orientation guide adjustment, not to display the display item in the 2-area enlargement display.

16. A non-transitory computer-readable storage medium storing a program for causing a computer to execute a method for controlling an imaging apparatus having an orientation detector for detecting an orientation of the imaging apparatus, the method comprising:
performing control to display an orientation guide for indicating an orientation of the imaging apparatus based on the orientation detected by the orientation detector;
performing display control to perform 2-area enlargement display for displaying live view images captured in two different areas horizontally or vertically separated from each other by an imaging unit, side by side on a display unit; and
adjusting, upon reception of a specific operation while the 2-area enlargement display is being performed, a reference of the orientation guide based on the orientation detected by the orientation detector when the specific operation is received,
wherein the display control is capable of performing the 2-area enlargement display as an adjustment screen for the orientation guide displayed through selection of a menu item for the orientation guide adjustment out of a plurality of menu items in a menu screen for performing various settings related to the imaging apparatus,
wherein the display control is also capable of performing the 2-area enlargement display not through the selection of the menu item for the orientation guide adjustment from an imaging standby screen displaying live view images,
wherein the display control performs control,
when performing the 2-area enlargement display as the adjustment screen for the orientation guide, to display a display item related to the orientation guide adjustment in the 2-area enlargement display, and
when performing the 2-area enlargement display not through the selection of the menu item for the orientation guide adjustment, not to display the display item in the 2-area enlargement display.

17. An imaging apparatus comprising:
an orientation detector configured to detect an orientation of the imaging apparatus; and
at least one memory and at least one processor which function as:
a control unit configured to perform control to display an orientation guide for indicating an orientation of the imaging apparatus based on the orientation detected by the orientation detector;
a display control unit configured to perform control to perform 2-area enlargement display for displaying live view images captured in two different areas horizontally or vertically separated from each other by an imaging unit, side by side on a display unit; and
an adjustment unit configured to, upon reception of a specific operation while the 2-area enlargement display is being performed, adjust a reference of the orientation guide based on the orientation detected by the orientation detector when the specific operation is received,
wherein, in a case where a difference between the orientation detected by the orientation detector and an orientation stored as a reference orientation of the orientation guide is equal to or greater than a threshold value when a predetermined operation is performed while the 2-area enlargement display is being performed, the display control unit performs control to perform display for adjusting a reference of the orientation guide.

18. The imaging apparatus according to claim 17, wherein the predetermined operation is an operation for instructing to perform at least one of auto focus and auto exposure.

19. The imaging apparatus according to claim 17, wherein the predetermined operation is an operation on a shutter button.

20. A method for controlling an imaging apparatus having an orientation detector for detecting an orientation of the imaging apparatus, the method comprising:
performing control to display an orientation guide for indicating an orientation of the imaging apparatus based on the orientation detected by the orientation detector;
performing display control to perform 2-area enlargement display for displaying live view images captured in two different areas horizontally or vertically separated from each other by an imaging unit, side by side on a display unit; and
adjusting, upon reception of a specific operation while the 2-area enlargement display is being performed, a reference of the orientation guide based on the orientation detected by the orientation detector when the specific operation is received,
wherein, in a case where a difference between the orientation detected by the orientation detector and an orientation stored as a reference orientation of the orientation guide is equal to or greater than a threshold value when a predetermined operation is performed while the 2-area enlargement display is being performed, the display control performs control to perform display for adjusting a reference of the orientation guide.

21. A non-transitory computer-readable storage medium storing a program for causing a computer to execute a method for controlling an imaging apparatus having an orientation detector for detecting an orientation of the imaging apparatus, the method comprising:
performing control to display an orientation guide for indicating an orientation of the imaging apparatus based on the orientation detected by the orientation detector;
performing display control to perform 2-area enlargement display for displaying live view images captured in two different areas horizontally or vertically separated from each other by an imaging unit, side by side on a display unit; and
adjusting, upon reception of a specific operation while the 2-area enlargement display is being performed, a reference of the orientation guide based on the orientation detected by the orientation detector when the specific operation is received,
wherein, in a case where a difference between the orientation detected by the orientation detector and an orientation stored as a reference orientation of the orientation guide is equal to or greater than a threshold value when a predetermined operation is performed while the 2-area enlargement display is being performed, the display control performs control to perform display for adjusting a reference of the orientation guide.

* * * * *